United States Patent
Kullmann et al.

(10) Patent No.: US 9,597,742 B2
(45) Date of Patent: Mar. 21, 2017

(54) SAW BLADE INCLUDING A CUTTING ELEMENT MADE BY POWDER METALLURGY

(71) Applicant: WIKUS-Saegenfabrik Wilhelm H. Kullmann GmbH & Co. KG, Spangenberg (DE)

(72) Inventors: Joerg H. Kullmann, Spangenberg (DE); Gert Kellezi, Leoben (AT); Devrim Caliskanoglu, Giessen (DE)

(73) Assignee: WIKUS-SAEGENFABRIK WILHELM H. KULLMANN GMBH & CO. KG, Spangenberg (DE)

( * ) Notice: Subject to any disclaimer, the term of this patent is extended or adjusted under 35 U.S.C. 154(b) by 916 days.

(21) Appl. No.: 13/888,838

(22) Filed: May 7, 2013

(65) Prior Publication Data

US 2013/0298743 A1    Nov. 14, 2013

(30) Foreign Application Priority Data

May 8, 2012    (EP) ..................... 12167121

(51) Int. Cl.
*B23D 61/12* (2006.01)
*B26D 1/18* (2006.01)
*B23D 61/00* (2006.01)
*B22F 7/06* (2006.01)
*B22F 7/08* (2006.01)
*C22C 33/02* (2006.01)
*B23D 61/02* (2006.01)
(Continued)

(52) U.S. Cl.
CPC .............. *B23D 61/00* (2013.01); *B22F 7/062* (2013.01); *B22F 7/08* (2013.01); *B23D 61/028* (2013.01);
(Continued)

(58) Field of Classification Search
CPC .... B23D 61/00; B23D 61/028; B23D 61/127; B22F 7/062; B22F 7/08; B22F 2005/001; C21D 9/24; C21D 6/002; C22C 38/04; C22C 38/18; C22C 38/22; C22C 38/24; C22C 38/30; Y10T 83/9317; Y10T 83/9319
(Continued)

(56) References Cited

U.S. PATENT DOCUMENTS 4,041,274 A * 8/1977 Sadowski ............ B23K 35/365
219/137 WM
5,091,264 A † 2/1992 Daxelmueller
(Continued)

FOREIGN PATENT DOCUMENTS

AT    507 956 A1    9/2010
DE    42 00 423 A1    7/1993
(Continued)

OTHER PUBLICATIONS

George Roberts et al, Tool Steels Fifth Edition, pp. 34 and 255, Jan. 1998, ASM International, Materials Park, Ohio.†

*Primary Examiner* — Omar Flores Sanchez
(74) *Attorney, Agent, or Firm* — Thomas | Horstemeyer, LLP

(57) ABSTRACT

A saw blade (1) includes a tooth supporting body (2) and a plurality of teeth (3) being arranged at the tooth supporting body (2). Each of the plurality of teeth (3) includes a tooth tip (8) including a cutting portion (9). The cutting portion (9) and at least another part of the tooth tip (8) of the teeth (3) are made of a steel alloy that has been produced by powder metallurgy and full annealing.

6 Claims, 9 Drawing Sheets

(51) Int. Cl.
- *C22C 38/18* (2006.01)
- *C22C 38/22* (2006.01)
- *C22C 38/24* (2006.01)
- *C22C 38/30* (2006.01)
- *C21D 9/24* (2006.01)
- *C22C 38/04* (2006.01)
- *B22F 5/00* (2006.01)
- *C21D 6/00* (2006.01)

(52) U.S. Cl.
CPC ........... *B23D 61/127* (2013.01); *C21D 9/24* (2013.01); *C22C 33/0257* (2013.01); *C22C 38/04* (2013.01); *C22C 38/18* (2013.01); *C22C 38/22* (2013.01); *C22C 38/24* (2013.01); *C22C 38/30* (2013.01); *B22F 2005/001* (2013.01); *C21D 6/002* (2013.01); *Y10T 83/9317* (2015.04); *Y10T 83/9319* (2015.04)

(58) Field of Classification Search
USPC .................. 83/835, 846, 853; 76/104.1, 112; 420/122, 89
See application file for complete search history.

(56) References Cited

U.S. PATENT DOCUMENTS

| | | | |
|---|---|---|---|
| 5,477,763 A | | 12/1995 | Kullman |
| 5,482,531 A | * | 1/1996 | Pinnow .............. B22D 17/2209 420/95 |
| 6,701,627 B2 | * | 3/2004 | Korb ..................... B21D 53/64 30/350 |
| 6,861,161 B2 | * | 3/2005 | Ponemayr ............ B23D 61/028 30/166.3 |
| 7,210,388 B2 | * | 5/2007 | Pacher ................. B23D 61/127 30/345 |
| 2003/0154841 A1 | | 8/2003 | Pacher et al. |
| 2009/0257903 A1 | | 10/2009 | Sundin |

FOREIGN PATENT DOCUMENTS

| | | | |
|---|---|---|---|
| EP | 0 106 929 A2 | | 5/1984 |
| EP | 0 319 511 A1 | | 11/1988 |
| WO | 86/04360 A1 | † | 7/1986 |

\* cited by examiner
† cited by third party

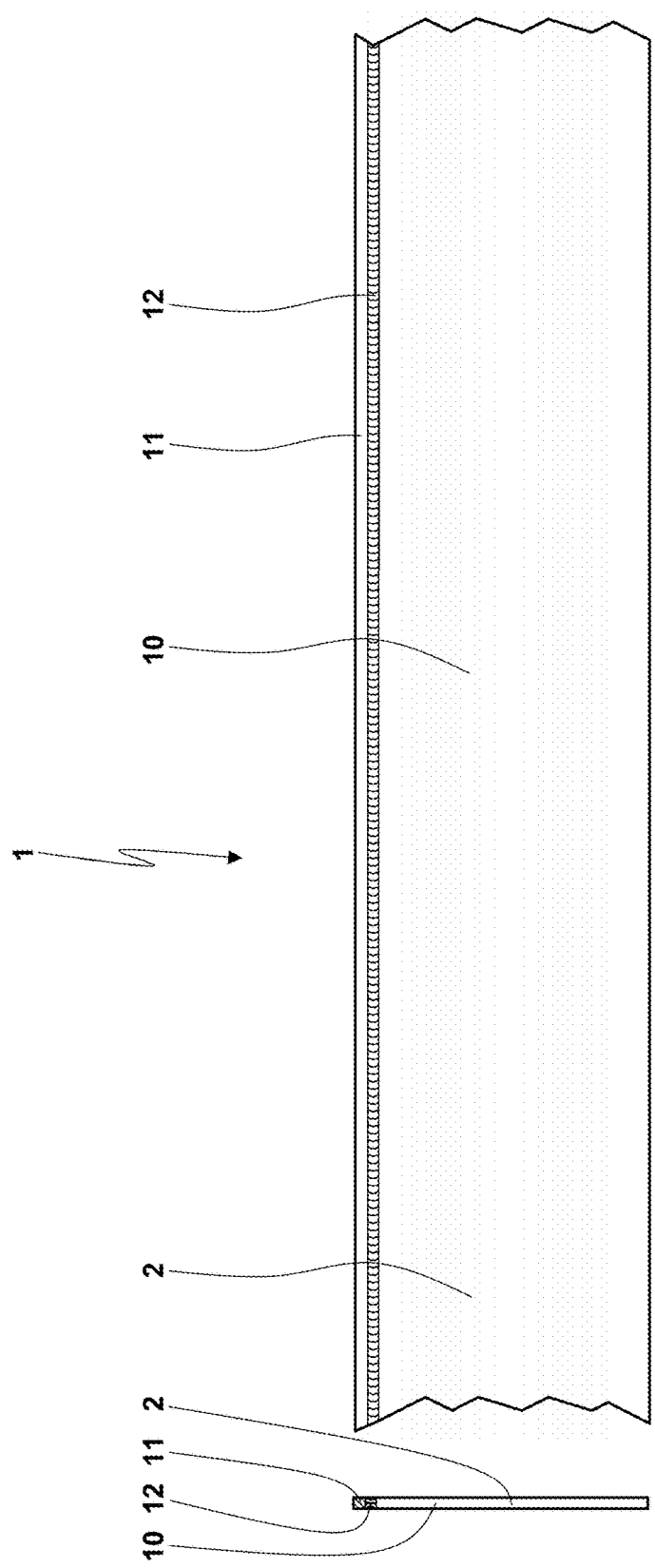

SAW BLADE INCLUDING A CUTTING
ELEMENT MADE BY POWDER
METALLURGY

CROSS REFERENCE TO RELATED
APPLICATIONS

This application claims priority to co-pending European Patent Application No. EP 12 167 121.8 entitled "Sägeblatt mit einem pulvermetallurgisch hergestellten Schneidteil", filed May 8, 2012.

FIELD OF THE INVENTION

The invention relates to a saw blade including a tooth supporting body and a plurality of teeth being arranged at the tooth supporting body, each of the plurality of teeth including a tooth tip having a cutting portion.

Such saw blades may be especially designed as elongated saw band having a linear arrangement of the teeth one after the other or as hacksaw blade, a circular saw blade, a machine saw blade, a reciprocating saw blade or a jigsaw blade.

The tooth supporting body and the tooth base are preferably made of metal, especially tempered steel. The cutting portion and at least another portion of the tooth tip of the teeth are also made of metal, especially of alloyed tool steel and high-speed tool steel, respectively. This material is harder than the material of the tooth supporting body resulting in the saw blade being especially suitable for sawing metal materials. However, it is also possible to saw other materials—especially wood—with such saw blades.

BACKGROUND OF THE INVENTION

A saw blade including a tooth supporting body and a plurality of teeth being arranged at the tooth supporting body are known from German Patent Application No. DE 42 00 423 A1. This saw blade is also known under the trademark "FUTURA" of the applicant. Each of the plurality of teeth includes a tooth tip having a cutting portion. The teeth have different heights and widths, and they are arranged in a group being repeated along the tooth supporting body.

A bimetallic saw blade is known from Austrian Patent Application No. AT 507 956 A1. The saw blade includes a carrier strip portion being made of tempering steel and an edge wire portion being made of tool steel, especially a high-speed tool steel. The edge wire portion is arranged on the carrier strip portion, and it is connected thereto by welding.

A bimetallic saw band that has been produced by powder metallurgy is known from US Patent Application No. US 2009/0257903 A1.

A bimetallic saw band is known from European Patent application No. EP 0 319 511 A1 corresponding to US Patent Application No. U.S. Pat. No. 5,091,264.

Wear-resistant tools are known from European Patent Application No. EP 0 106 929 A2.

A bimetallic saw band is known from US Patent Application No. US 2003/0154841 A1.

SUMMARY OF THE INVENTION

The novel saw blade includes a tooth supporting body and a plurality of teeth being arranged at the tooth supporting body. Each of the plurality of teeth includes a tooth tip having a cutting portion. The cutting portion and at least another part of the tooth tip of the teeth are made of a steel alloy that has been produced by powder metallurgy and full annealing. The novel saw blade has great cutting capacity and great wear resistance at the same time.

DEFINITIONS

Saw blade: The term "saw blade" as used in this application is to be understood as designating an elongated saw band, a hacksaw blade, a circular saw blade or a different type of a saw blade.

Tooth supporting body: The term "tooth supporting body" as used in this application is to be understood as designating the part of the saw blade at which the teeth of the saw blade are arranged. Generally, one often uses the term of a "base body" of the saw blade in this context. The term of a "tooth supporting body" is however intended to better express that it is the part of the saw blade which itself cannot be designated as a tooth, but instead the part at which the teeth are arranged. It is to be taken into account that there are differences between the functional differentiation between the tooth supporting body and the teeth and the material related differentiation. Functionally, the tooth begins with its tooth base being located in the region of the tooth root. However, this tooth base often is made of the same material as the tooth supporting body, and it is designed as one piece therewith. In other words, a part of this material fulfills the function of the tooth supporting body and another part fulfills the function of the tooth base and thus the one of the tooth. The area of the separation of materials is however located further away from the tooth supporting body, namely in the region of the tooth tip.

Production by powder metallurgy: The term of a "production by powder metallurgy" is to be understood as the designating the production of metal powders and their further processing. Usually, this process includes at least three parts, namely the production of metal powder having comparatively fine carbide phases, shaping and sintering.

Full annealing: The term of "full annealing" as used in this application is to be understood as designating a specific heat treatment of the steel alloy. Full annealing is also designated as "large grain annealing", "high annealing" or "coarse grain tempering", and it serves to increase the grain size of the carbide phases and to homogenize the matrix in metal alloys by heating over a comparatively long hold time.

Carbides: Carbides are a group of substances of binary chemical compounds of an element E and carbon C with the general formula $E_xC_y$.

Metal carbides: Metal carbides are carbides in which the element E is a metal M. The metal carbides may also contain different metals.

Background

High-alloy ledeburitic tool steels solidify in cast blocks while usually forming comparatively rough carbides and carbide clusters potentially forming carbide bands in a deformed material depending on the direction of deformation. Such materials have anisotropic mechanical properties and a direction depending wear behavior. Such materials usually require a comparatively complex tempering process, and they especially wear out at the tooth tips of a saw blade. These tooth tips are subject to high stresses. They especially wear out due to breaking of the edge caused by material fatigue and/or deformation of cracks caused by alternating stresses. Edge breaks can also be caused by large carbides being located at the cutting portion.

Such material fatigue can be reduced by using steel alloys that have been produced by powder metallurgy. However, it has been shown that no substantial increase of the usable lifetime can be attained. These materials are isotropic to a large extent and can be easily processed, but they only have a limited hardness potential. The hardness potential is to be understood as the extent of the increase of the hardness during tempering of a material that has been martensitically transformed from the austenite structure and including retained austenite. Furthermore, the carbides in such steel alloys are very small due to the producing method and they have a globular shape. Thus, they are not that wear resistant.

Further Description

The novel saw blade in the region of the cutting portions of the teeth and at least another part of the tooth tips of the teeth is made of a steel alloy that has been produced in a special way.

The steel alloy is initially produced by powder metallurgy. In comparison to the production by melting metallurgy, the production by powder metallurgy results in the number of metal carbides being increased and their average size being reduced. Due to this method, the carbides have a globular and round, respectively, shape. This material is comparatively tough, but it does not have the desired wear resistance.

Due to the following step of full annealing, the number of carbides is reduced and their average size is increased. Due to the annealing, one attains rather "blocky" carbides due to coagulation. In this way, one attains a number and a size of the metal carbides balancing the otherwise contradicting features of great toughness and great wear resistance. Due to this special treatment of the material, one does not only attain an increased average carbide phase size, but also an increased homogeneity of the matrix. Such comparatively large carbides also remain in the structural composition since the matrix containing these carbides has achieved advantageous properties due to the full annealing. These rather "blocky" carbides perform better cutting work, and they have better wear resistance.

Thus, the blocky carbides have comparatively smaller radiuses and sharp edges. These radiuses are especially smaller than 1 μm.

The novel steel alloy thus has greater fracture toughness and preferably a critical stress intensity factor K of between 9 and 20 MPa·√m, or
between 12 and 16 MPa·√m, or
between 13 and 16 MPa·√m, or
between 14 and 16 MPa·√m.

The elongation at fracture as a quantity for the ductility of the novel steel alloy is especially between 3 and 4%.

Due to this new quality of at least a part of the tooth tips of the teeth, one attains an increased hardness potential while improving wear resistance. Due to the improved wear resistance, the risk of breakage in the region of the cutting portion is reduced. This results in the novel saw blade having a substantially improved cutting performance.

The material of the steel alloy may be especially a tool steel. It is known that tool steels include cold work tool steels, hot work tool steels and high-speed tool steels. It is preferred to use a high-speed tool steel. For example, this may be a ledeburitic tool steel.

The steel alloy preferably includes metal carbides having an average size of more than 2.0 μm and less than 4.0 μm and especially between 2.3 μm and 3.9 μm. They especially have an average size of at least 2.8 μm. Thus, this average size of the carbides is smaller than the one of a material that has been produced by melting metallurgy. A material that has been produced by melting metallurgy typically includes carbides with an average size of approximately 4 to 5 μm. The average size of the carbides of the new material is greater than the average size of metal carbides of approximately 2 μm as contained in usual materials that have been produced by powder metallurgy. The increase of the grain size of the carbides results in an increase of wear resistance while simultaneously reducing toughness. Reducing the grain size of the carbides results in an increase of the toughness while simultaneously reducing wear resistance.

The metal carbides may be especially $M_6C$ and MC. The share of carbide phases of $M_6C$ carbides and MC carbides may together be at least approximately 7 percent by volume of the structure of the steel alloy. The structure has a matrix including the carbides. The matrix may include carbide phases including between approximately 5.5 to 8.5 percent by volume of $M_6C$ carbides and between approximately 1.5 to 3.9 percent by volume of MC carbides.

Full annealing may be realized at a temperature of at least 1100° C., but at least 10° C. below the melting temperature of the structural phase of the steel alloy having the lowest melting temperature. This temperature is especially maintained over a period of time of at least approximately 10 hours, and preferably of at least 12 hours. In this way, the average carbide phase size of the material is increased by at least approximately 50%, and preferably by at least approximately 65%. The shape of the surface of the carbides is more blocky—i. e. it is less round—and the matrix is homogenized.

In the following, the steel alloy that has been produced by powder metallurgy and full annealing is preferably tempered. Due to hardening and tempering during the entire process of tempering, the finally desired material properties are realized. High tempering values are already attained at low hardening temperatures.

The steel alloy according to the invention in the tempered condition then preferably has a hardness of at least 60 HRC. Such a hardness in combination with the existing wear resistance is well suitable for sawing work pieces of metal.

Each of the plurality of teeth has a tooth base being located next to the tooth supporting body, the tooth base at least partly being made of the same material as the tooth supporting body. The tooth base and the tooth supporting body are thus functionally different parts, while they are made of the same material and they are preferably designed as one piece.

Each of the plurality of teeth in the region of its tooth tip may include a carrier strip portion and an edge wire portion being arranged thereon. The edge wire portion is made of the steel alloy being made by powder metallurgy and full annealing, and it forms the cutting element. Such a design is designated as a bimetallic saw blade.

The edge wire portion may be connected to the carrier strip portion without a filler material, especially by welding. This is especially realized by welding and preferably by laser beam welding or electron beam welding.

Instead of being designed as a bimetallic saw blade, the novel saw blade may also be designed as a saw blade having so called cutting material inserts. In this case, each of the plurality of teeth in the region of its tooth tip includes an insert being made of the steel alloy that has been produced by powder metallurgy and full annealing. This insert forms the cutting element. These inserts are also preferably connected to the tooth base without a filler material, especially by welding. However, they can also be connected by soldering or brazing while using a filler material.

In case of a saw blade including cutting material inserts, it is also imaginable that the cutting material inserts are made of a tool steel—especially a high-speed tool steel—of the prior art, i. e. a steel alloy that has been produced by powder metallurgy or by melting metallurgy, but not by full annealing. Such a saw blade is also not known from the prior art.

The teeth may be arranged at the tooth supporting body according to many different systems, especially in repeated groups of unset teeth having different heights and widths, as partly set teeth, as pre-cutters and finishing cutters and so forth.

In the following, some preferred exemplary new material compositions are listed:

Exemplary Embodiment 1

The steel alloy may especially include the following components:
 carbon: 0.8 to 1.4 percent by weight,
 chromium: 3.5 to 5.0 percent by weight,
 molybdenum: 0.1 to 10.0 percent by weight,
 vanadium: 0.8 to 10.5 percent by weight,
 tungsten: 0.1 to 10.0 percent by weight, and
 cobalt: 1.0 to 12.0 percent by weight.

Cobalt promotes the toughness of the matrix and the hot hardness in an especially effective way.

Exemplary Embodiment 2

Another preferred exemplary embodiment of the tool steel alloy is a cold work steel including the following components:
 carbon: 1.0 to 3.0 percent by weight,
 chromium: 0 to 12.0 percent by weight,
 molybdenum: 0.1 to 5.0 percent by weight,
 vanadium: 0.8 to 10.5 percent by weight, and
 tungsten: 0.1 to 3.0 percent by weight.

Exemplary Embodiment 3

The following composition is another advantageous composition of the steel alloy:
 carbon: 0.9 to 1.4, preferably 1.0 to 1.3 percent by weight,
 manganese: 0.15 to 0.5, preferably 0.2 to 0.35 percent by weight,
 chromium: 3.0 to 5.0, preferably 3.5 to 4.5 percent by weight,
 molybdenum: 3.0 to 10.0 percent by weight,
 tungsten: 1.0 to 10.0 percent by weight,
 molybdenum+tungsten/2 (W/2): 6.5 to 12.0, preferably 7.0 to 11.0 percent by weight,
 vanadium: 0.9 to 6.0, preferably 1.0 to 4.5 percent by weight, and
 cobalt: 7.0 to 11.0, preferably 8.0 to 10.0 percent by weight.

Exemplary Embodiment 4

The following composition is another advantageous composition of the steel alloy:
 carbon: 0.8 to 3.0 percent by weight,
 chromium: 0 to 12.0 percent by weight,
 molybdenum: 0.1 to 5.0 percent by weight,
 vanadium: 0.8 to 10.5 percent by weight, and
 tungsten: 0.1 to 3.0 percent by weight.

All above mentioned exemplary materials may additionally include silicon, manganese, sulfur and/or nitrogen. Alternatively or additionally, nickel, aluminum, niobium and/or titanium as well as potentially iron, companying elements caused by the melting process and impurities may be contained as a rest.

These materials may also have a share of at least one of the following elements as it is listed below:
 silicon: 0.1 to 0.5, preferably 0.15 to 0.3 percent by weight,
 phosphorus: 0 to 0.03, preferably up to a maximum of 0.02 percent by weight,
 sulfur: 0 to 0.3, preferably up to a maximum of 0.03 percent by weight, and
 nitrogen: 0 to 0.1, preferably up to a maximum of 0.08 percent by weight.

The share of carbon in the matrix may be especially between approximately 1.45 to 0.75. The average size of the metal carbides is at least 2.8 µm, preferably at least 3.2 µm.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if a cutting portion is mentioned, this is to be understood such that there is exactly one cutting portion or there are two cutting portions or more cutting portions. If however it is intended to mention the exact number of a feature, the adjective "exactly" is used before the respective feature. Additional features may be added to these features, or these features may be the only features of the respective product.

BRIEF DESCRIPTION OF THE DRAWINGS

In the following, the invention is further explained and described with reference to preferred exemplary embodiments illustrated in the drawings.

FIG. 2 illustrates a part of a side view of the saw blade according to FIG. 1 before the arrangement of the teeth.

FIG. 3 illustrates a front view of the saw blade according to FIG. 2.

DETAILED DESCRIPTION

Figure 1:
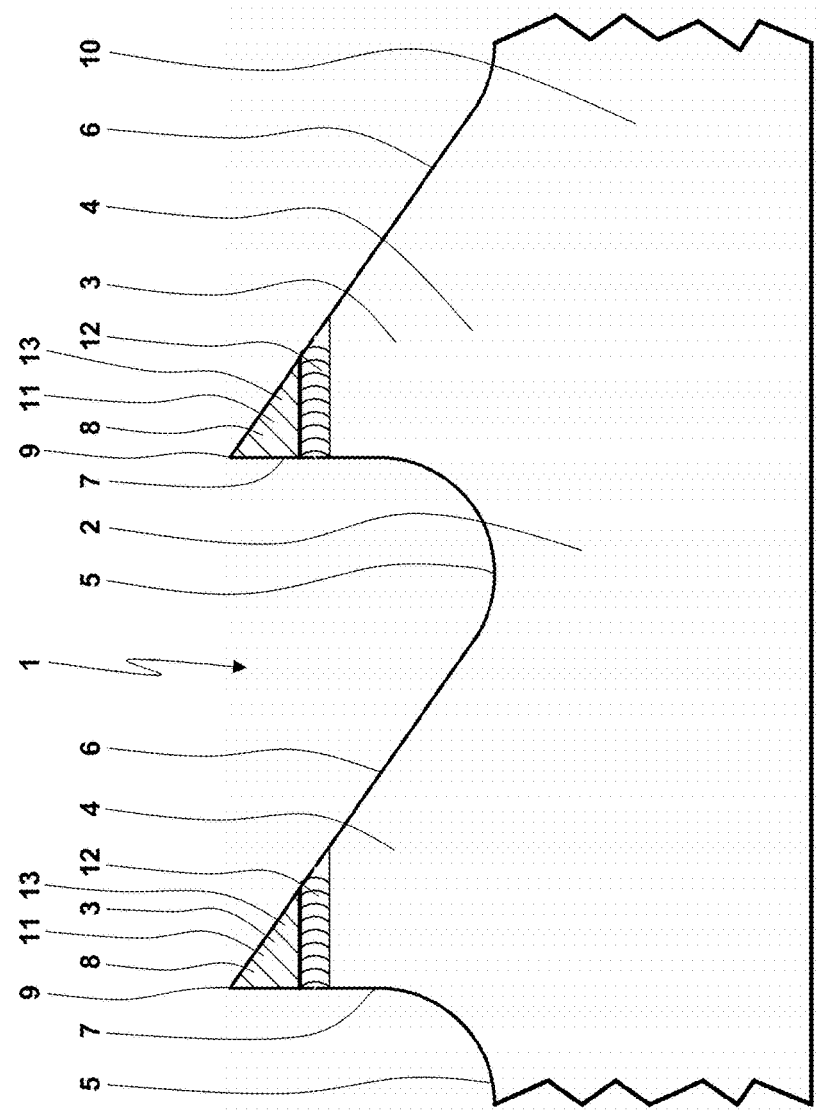
FIG. 1 illustrates a part of a side view of a first exemplary embodiment of the novel saw blade being designed as a bimetallic saw band.

FIG. 1 illustrates a side view of a first exemplary embodiment of the novel saw blade 1. It is to be understood that FIG. 1 only shows a section of a saw blade 1 that actually extends further towards the left side and the right side as well as in a downward direction as seen in the illustration of FIG. 1. The saw blade 1 illustrated in FIG. 1 is designed as an elongated saw band. However, the saw blade 1 could also be a circular saw blade or a hacksaw blade being less long.

The saw blade 1 includes a tooth supporting body 2 being made of metal and especially of a steel alloy. A plurality of teeth 3 is arranged at the tooth supporting body 2. Each of the plurality of teeth 3 includes a tooth base 4, a tooth root 5, a tooth back 6, a tooth face 7 and a tooth tip 8. A cutting portion 9 is located at the tooth tip 8.

In the present example, the saw blade 1 is a bimetallic saw blade having a design before the teeth 3 are produced by grinding or milling as this is illustrated in FIGS. 2 and 3. Such a bimetallic saw blade 1 includes a carrier strip portion 10 on which an edge wire portion 11 is fixedly arranged. In the present case, the carrier strip portion 10 and the edge wire portion 11 are interconnected by welding without filler materials. This is indicated by the welding zone 12. The height of the welding zone 12 is illustrated in an exaggerated way to improve its perceptibility. The wire edge portion 11 then forms the actual cutting portion 13, i. e. the portion of the saw blade 1 with which the chips of the material to be cut are substantially removed.

The cutting portion 9 and at least another part of the tooth tip 8 of the teeth 3—in the present case the wire edge portion 11—are made of a special novel material, namely a steel alloy that has been produced by powder metallurgy and full annealing. This novel steel alloy has a hardness of at least 60 HRC while it simultaneously has great toughness. With respect to the other special features of the novel material, it is referred to the above description.

Figure 4:
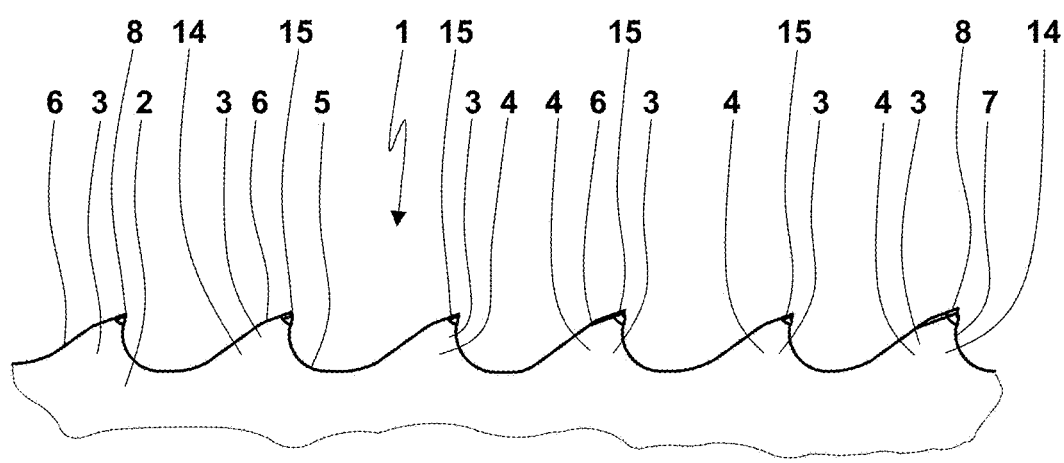
FIG. 4 illustrates a part of a side view of a second exemplary embodiment of the novel saw blade being designed as a saw band including cutting material inserts.
Figure 5:
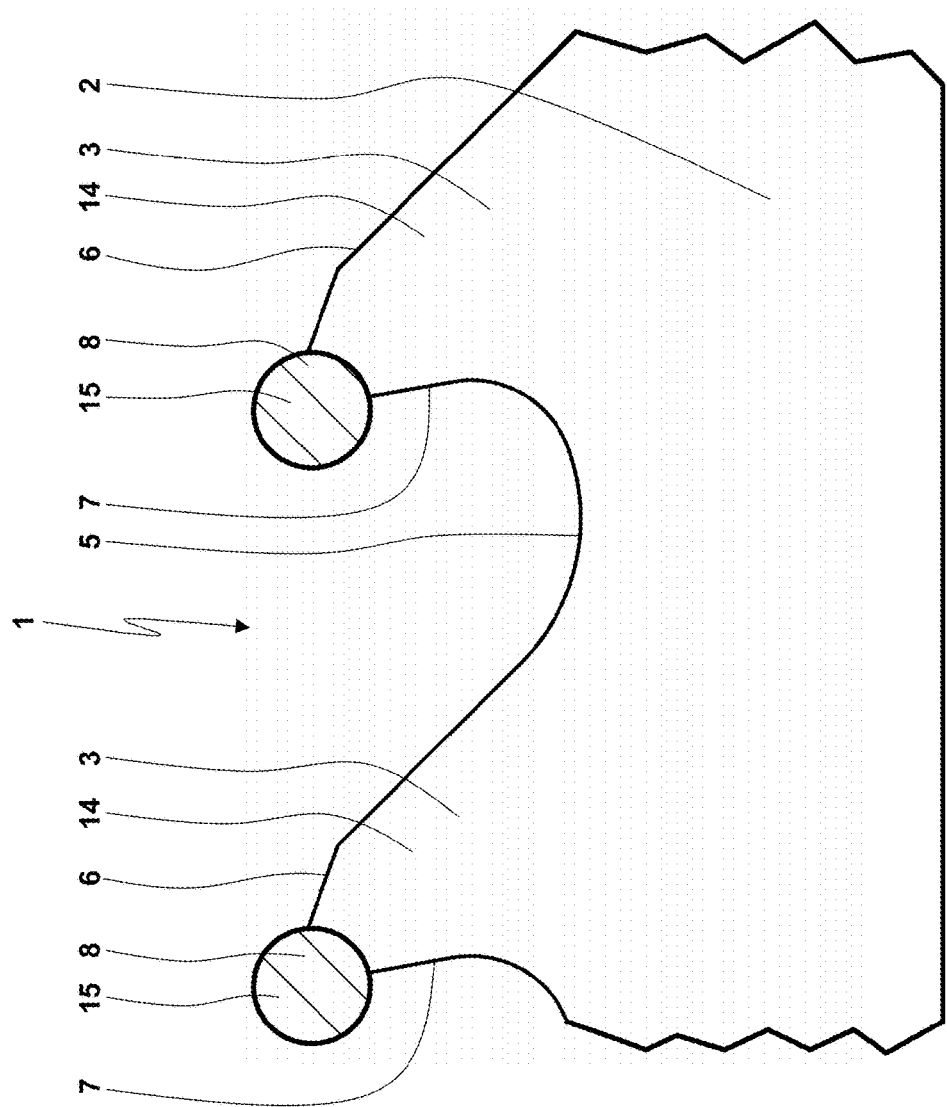
FIG. 5 illustrates a part of a side view of the novel saw blade including cutting material inserts before grinding.

FIGS. 4 and 5 illustrate additional exemplary embodiments of the novel saw blade 1 being designed as a saw band.

In this case, it is not a bimetallic saw blade, but a saw blade 1 having so called cutting material inserts. The tooth supporting body 2 is designed as one piece with the tooth base 4 such that protrusions 14 are formed. The protrusions 14 are made of the same comparatively softer material as the tooth supporting body 2. Harder inserts 15 are fixedly connected to these protrusions 14. The inserts 15 are made of the novel steel alloy being produced by powder metallurgy and full annealing. The inserts 15 having the shape illustrated in FIG. 5—or a different shape (for example a rectangular shape)—are fixedly connected to the protrusions 14. They then attain the shape illustrated in FIG. 4 by grinding such that they include a cutting portion 9 and they form the cutting element 14. The inserts 15 may be connected to the protrusions 14 by welding, soldering, brazing, screwing or in a different suitable way.

To better explain the differences of the novel material compared to the materials known from the prior art, the prior art is explained in the following.

Figure 6:
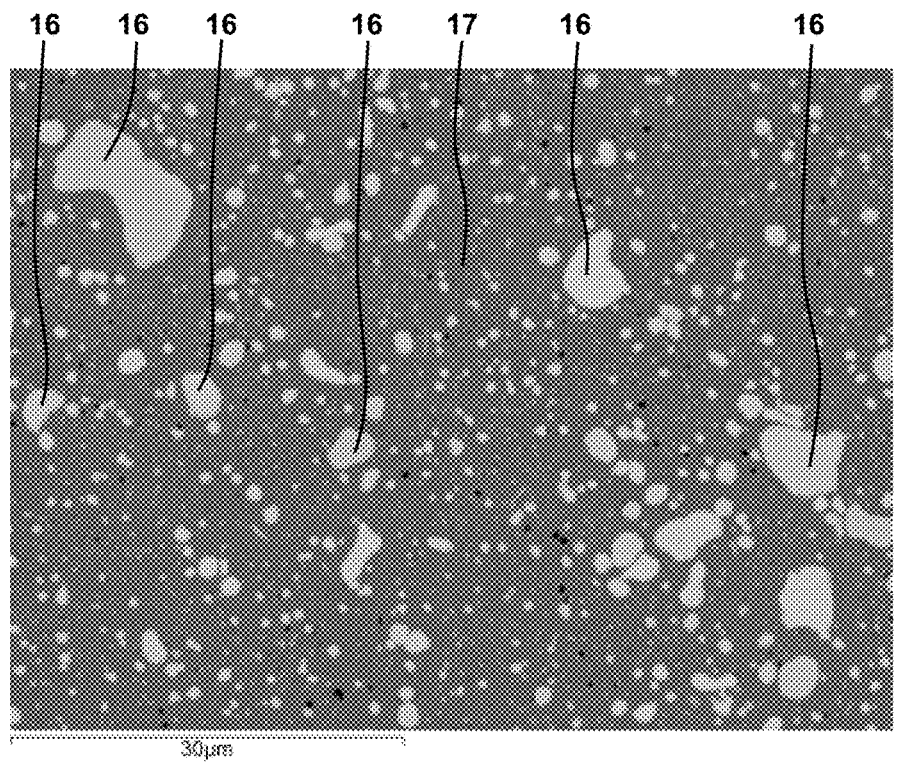
FIG. 6 illustrates a micrograph of a high-speed tool steel of the prior art that has been produced by melting metallurgy.

FIG. 6 illustrates a micrograph of a high-speed tool steel in its untempered condition, the steel being conventionally produced by melting metallurgy. Such a high-speed tool steel is also designated as M42. In the illustrated soft annealed condition, it is to be seen that there is no homogenous distribution of the metal carbides 16 in the matrix 17. The size and the shape of the carbides 16 vary substantially. Such a material has an unsatisfying toughness.

Figure 7:
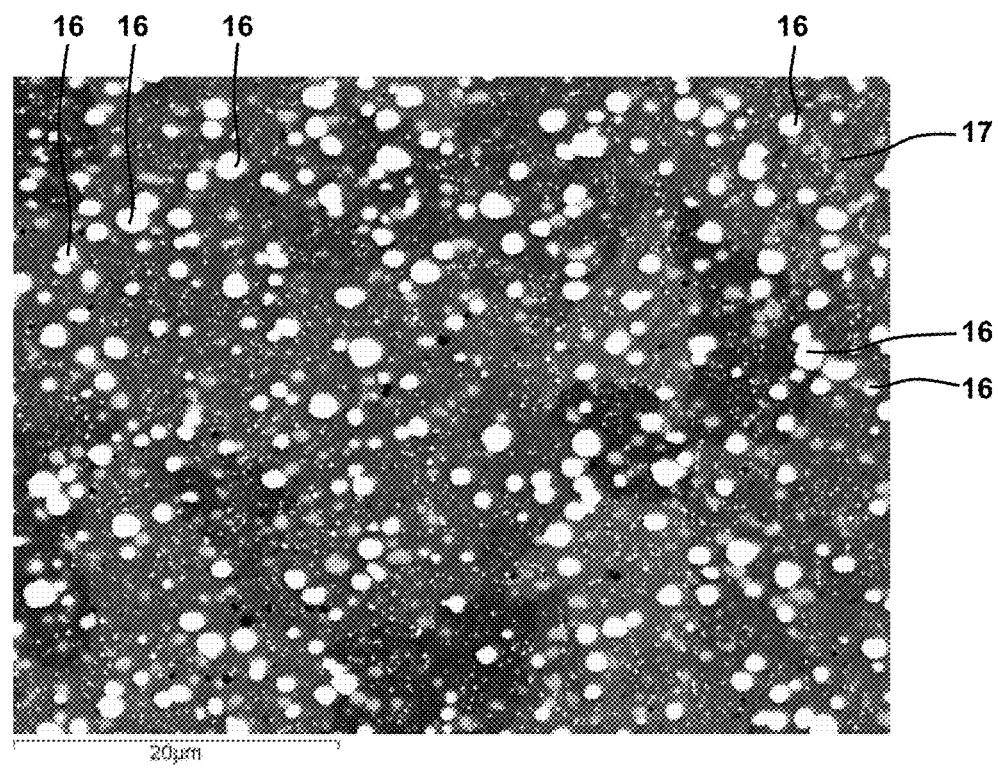
FIG. 7 illustrates a micrograph of a high-speed tool steel of the prior art that has been produced by powder metallurgy.

FIG. 7 illustrates a respective micrograph of a high-speed tool steel of the prior art in its untempered condition, the steel being produced by powder metallurgy. The average size of the metal carbides 16 is approximately 2 µm. Such a work piece has an unsatisfying wear resistance.

Figure 8:
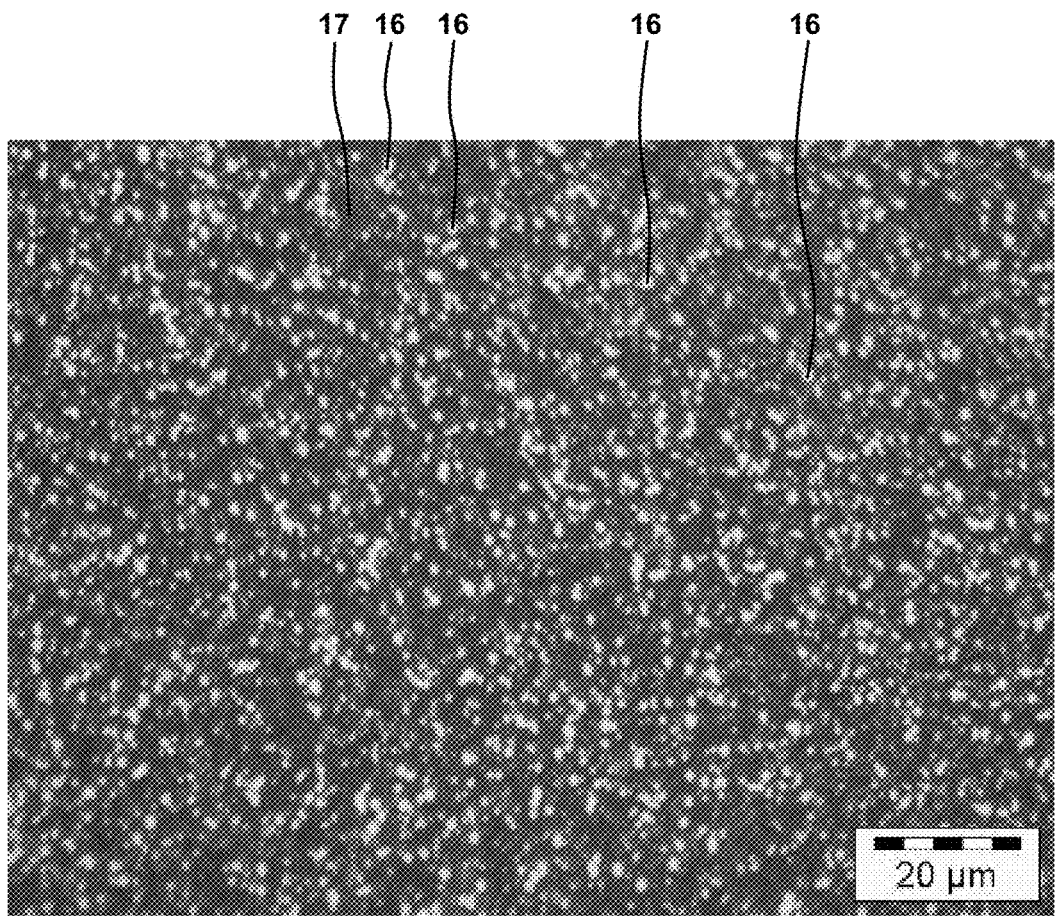
FIG. 8 illustrates a micrograph of a high-speed tool steel of the prior art that has been produced by powder metallurgy, the steel being in its tempered condition.

FIG. 8 illustrates the high-speed tool steel of the prior art according to FIG. 7 in its tempered condition. It is to be seen that the metal carbides 16 are now distributed in a homogeneous way. They are smaller and have an average size of approximately 1.6 µm.

Figure 9:
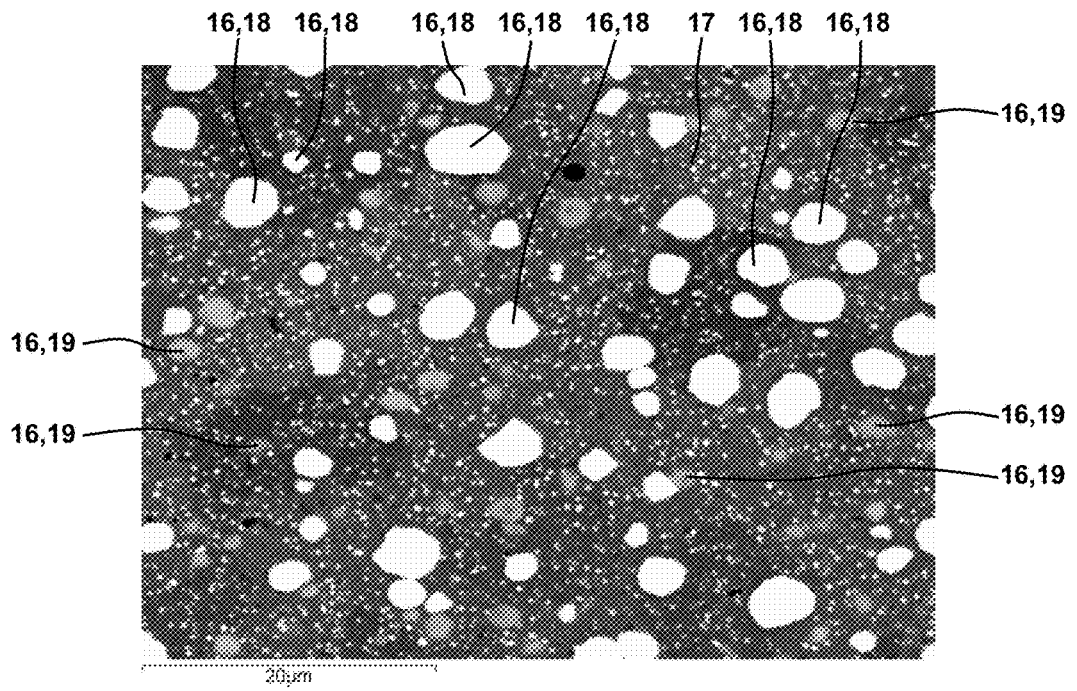
FIG. 9 illustrates a micrograph of a first exemplary embodiment of the new material being a high-speed tool steel that has not yet been tempered.

FIG. 9 illustrates a micrograph of an exemplary embodiment of the novel material that has been produced by powder metallurgy and full annealing. In this case, it is a high-speed tool steel in the soft annealed condition, i. e. the untempered condition. The average size of the metal carbides 16 is approximately 4 µm. This increase compared to the prior art according to FIG. 7 has been achieved by full annealing. The larger metal carbides 16 are $M_6C$ carbides 18. The medium size gray metal carbides 16 are MC carbides 19. For reasons of clarity, only a part of the carbides 16 are designated with reference numerals. This also applies to the following drawings.

Figure 10:
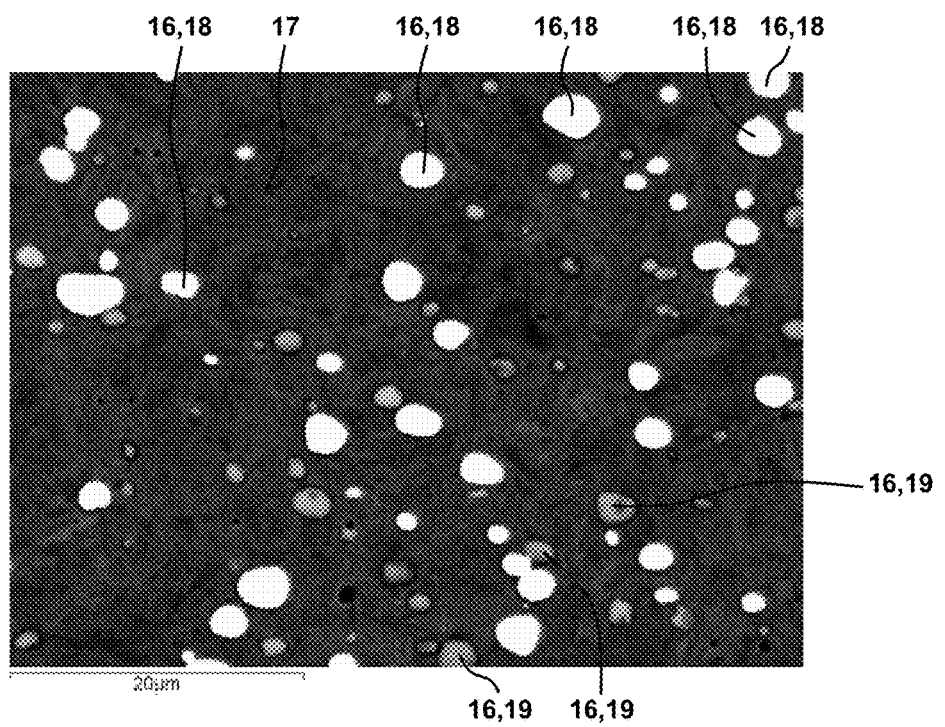
FIG. 10 illustrates a scanning electron microscope (SEM) picture of the material according to FIG. 9 in its tempered condition.

FIG. 10 illustrates a SEM picture of the novel high-speed tool steel in its tempered condition. In this view, substantially only the $M_6C$ carbides 18 and the MC carbides 19 are to be seen in the matrix 17.

Figure 11:
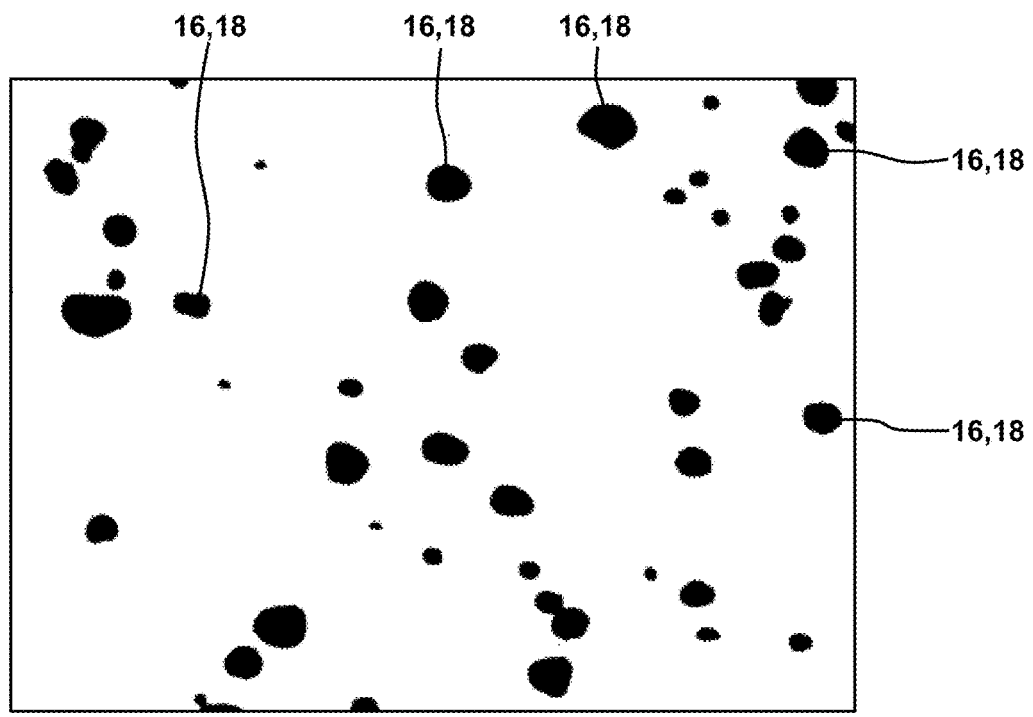
FIG. 11 illustrates the SEM picture according to FIG. 10, wherein a first graphical post-processing step has been conducted to improve perceptibility of the metal carbides.

FIG. 11 illustrates another SEM picture of the structure of the novel material according to FIG. 4. In this case, graphical post-processing has been conducted in a way that the matrix 17 and the MC carbides 19 are no longer visible. Only the $M_6C$ carbides 18 are visible as the black portions.

Figure 12:
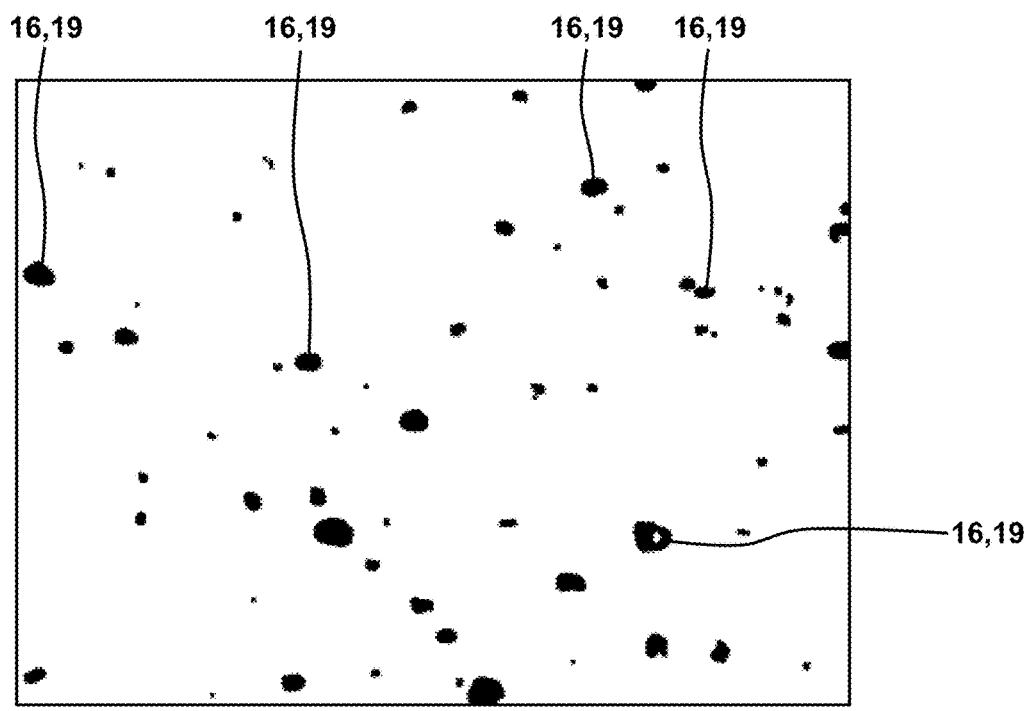
FIG. 12 illustrates the SEM picture according to FIG. 10, wherein a second graphical post-processing step has been conducted to improve perceptibility of the metal carbides.

FIG. 12 illustrates a similar graphically post-processed view as FIG. 11. In this case, post-processing has been conducted in a way such that only the MC carbides 19 are illustrated as black spots.

Figure 13:
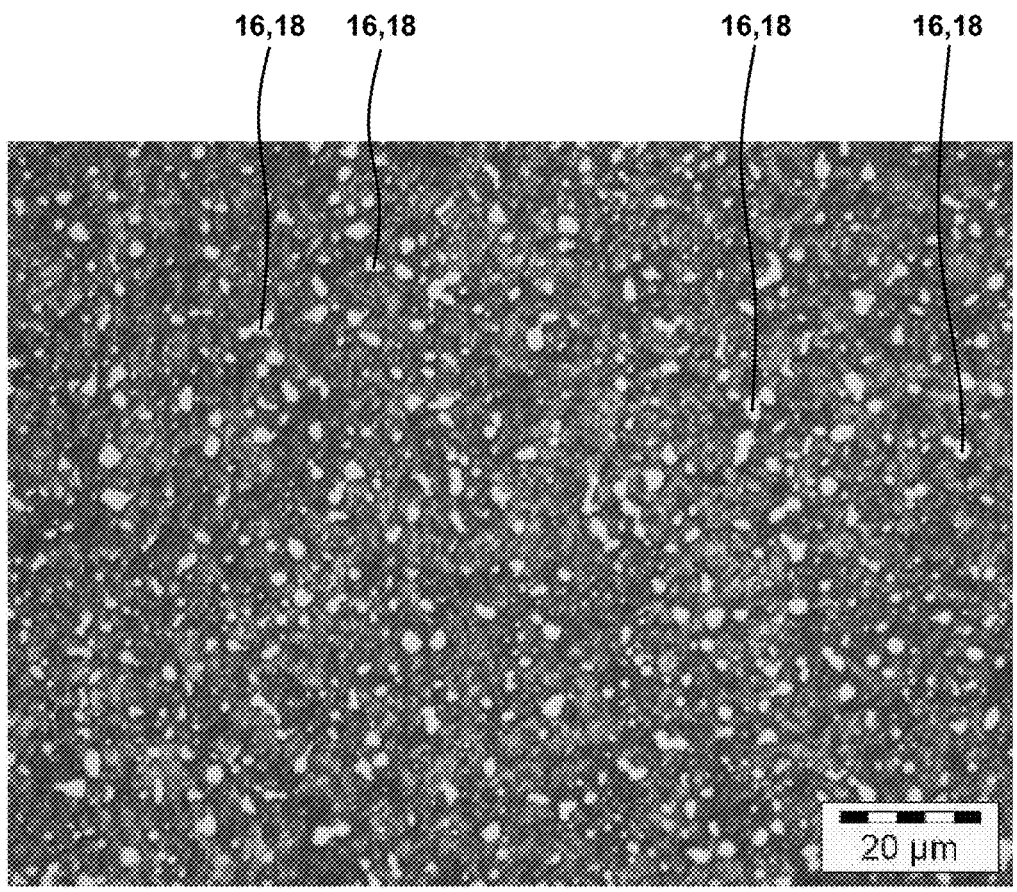
FIG. 13 illustrates another micrograph of the new material.

FIG. 13 illustrates a micrograph of the novel material. In this case, this again is a high-speed tool steel in its tempered condition. In this illustration, the homogenous distribution of the metal carbides 16 is well visible. The average size of the metal carbides 16 is approximately 3.6 µm.

We claim:

1. A saw blade, comprising:
a tooth supporting body; and
a plurality of teeth being arranged at the tooth supporting body, each of the plurality of teeth including a tooth tip having a cutting portion,
the cutting portion and at least another part of the tooth tip of the teeth being made of a steel alloy that has been produced by powder metallurgy and full annealing such that it includes metal carbides having an average size of more than 2.0 µm and less than 4.0 µm,
wherein the steel alloy has a structure including phases and full annealing has been conducted at a temperature of at least 1100° C., but at least 10° C. below the melting temperature of the structural phase of the steel alloy having the lowest melting temperature.

2. A saw blade, comprising:
a tooth supporting body; and
a plurality of teeth being arranged at the tooth supporting body, each of the plurality of teeth including a tooth tip having a cutting portion, the cutting portion and at least another part of the tooth tip of the teeth being made of a steel alloy that has been produced by powder metallurgy and full annealing such that it includes metal carbides having an average size of at least 2.8 µm and less than 4.0 µm, and wherein the steel alloy has a critical stress intensity factor of between 13 and 16 MPa·√m.

3. A saw blade, comprising:
a tooth supporting body; and
a plurality of teeth being arranged at the tooth supporting body, each of the plurality of teeth including a tooth tip having a cutting portion,
the cutting portion and at least another part of the tooth tip of the teeth being made of a steel alloy that has been produced by powder metallurgy and full annealing such that it includes metal carbides having an average size of more than 2.0 µm and less than 4.0 µm,
wherein each of the plurality of teeth in the region of its tooth tip includes a carrier strip portion and an edge wire portion being located thereon, the edge wire portion being made of the steel alloy that has been produced by powder metallurgy and full annealing, the edge wire portion forming a cutting element,
wherein the edge wire portion is connected to the carrier strip portion without a filler material.

4. A saw blade, comprising:
a tooth supporting body; and
a plurality of teeth being arranged at the tooth supporting body, each of the plurality of teeth including a tooth tip having a cutting portion,
the cutting portion and at least another part of the tooth tip of the teeth being made of a steel alloy that has been produced by powder metallurgy and full annealing such that it includes metal carbides having an average size of more than 2.0 µm and less than 4.0 µm,
wherein each of the plurality of teeth in the region of its tooth tip includes an insert being made by the steel alloy that has been produced by powder metallurgy and full annealing, the insert forming a cutting element.

5. A saw blade, comprising:
a tooth supporting body; and
a plurality of teeth being arranged at the tooth supporting body, each of the plurality of teeth including a tooth tip having a cutting portion,
the cutting portion and at least another part of the tooth tip of the teeth being made of a steel alloy that has been produced by powder metallurgy and full annealing such that it includes metal carbides having an average size of more than 2.0 µm and less than 4.0 µm,
wherein each of the plurality of teeth in the region of its tooth tip includes an insert being made by the steel alloy that has been produced by powder metallurgy and full annealing, the insert forming a cutting element, and
wherein the inserts are connected to the tooth base without filler materials.

6. A saw blade, comprising:
a tooth supporting body; and
a plurality of teeth being arranged at the tooth supporting body, each of the plurality of teeth including a tooth tip having a cutting portion,
the cutting portion and at least another part of the tooth tip of the teeth being made of a steel alloy that has been produced by powder metallurgy and full annealing such that it includes metal carbides having an average size of at least 2.8 µm and less than 4.0 µm, and
wherein the steel alloy includes the following components:
carbon: 0.8 to 1.4 percent by weight,
chromium: 3.5 to 5.0 percent by weight,
molybdenum: 0.1 to 10.0 percent by weight,
vanadium: 0.8 to 10.5 percent by weight,
tungsten: 0.1 to 10.0 percent by weight, and
cobalt: 1.0 to 12.0 percent by weight.

* * * * *